Nov. 17, 1970  D. D. ZEBLEY ET AL  3,540,097
HOISTING AND TRANSPORTING APPARATUS, ESPECIALLY
FOR LOOM WARP BEAMS
Filed Oct. 21, 1968  5 Sheets-Sheet 4

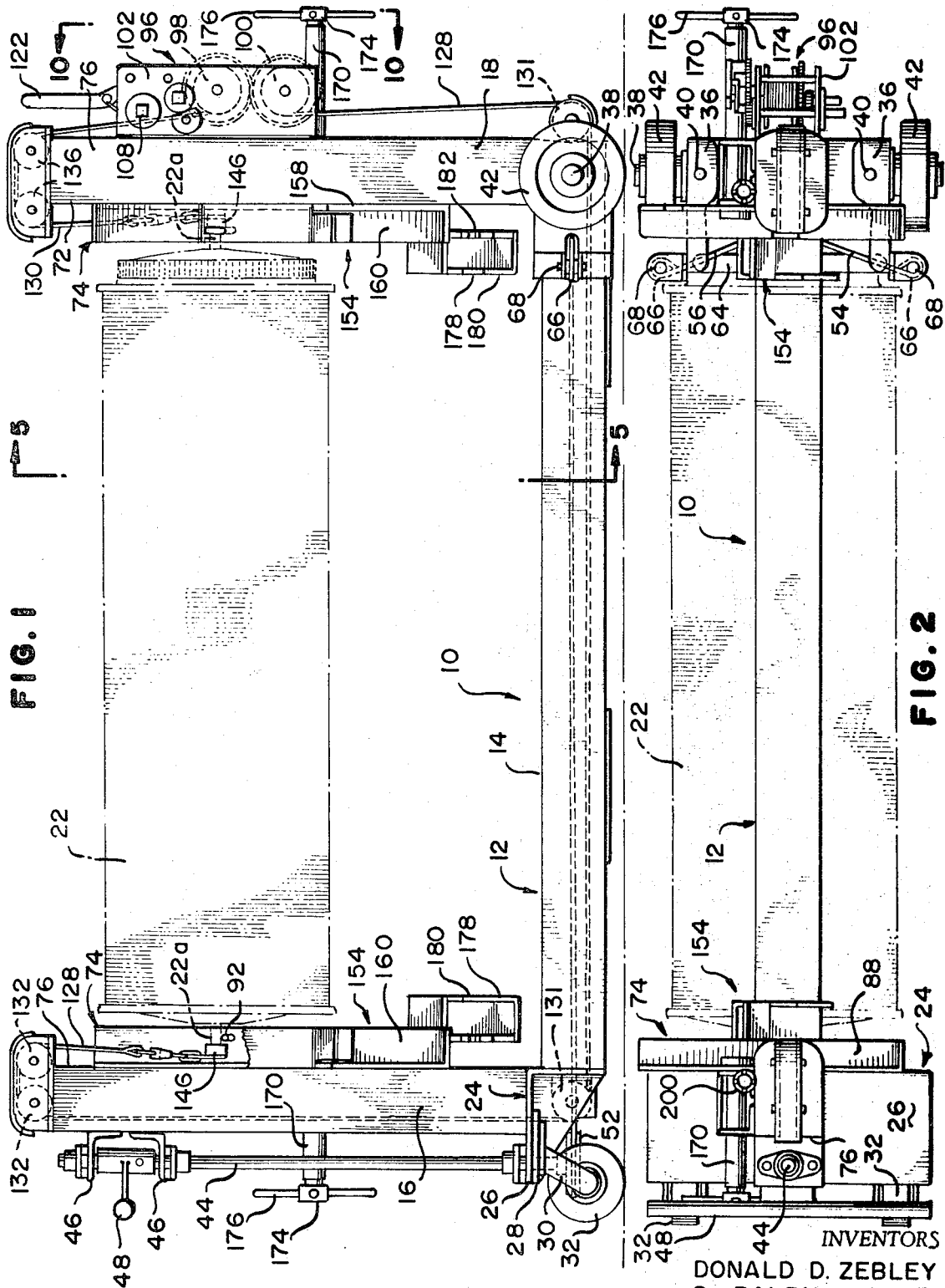

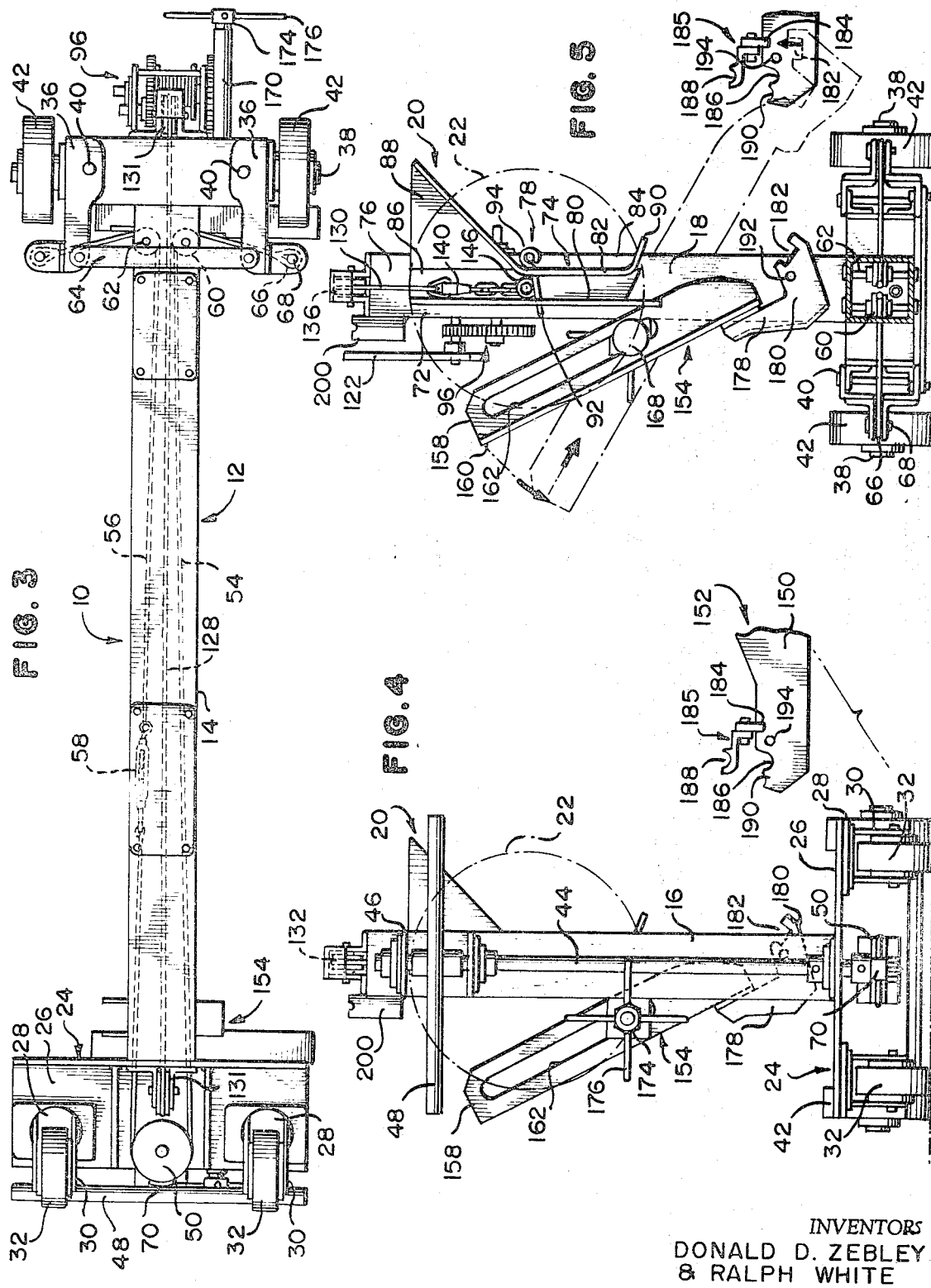

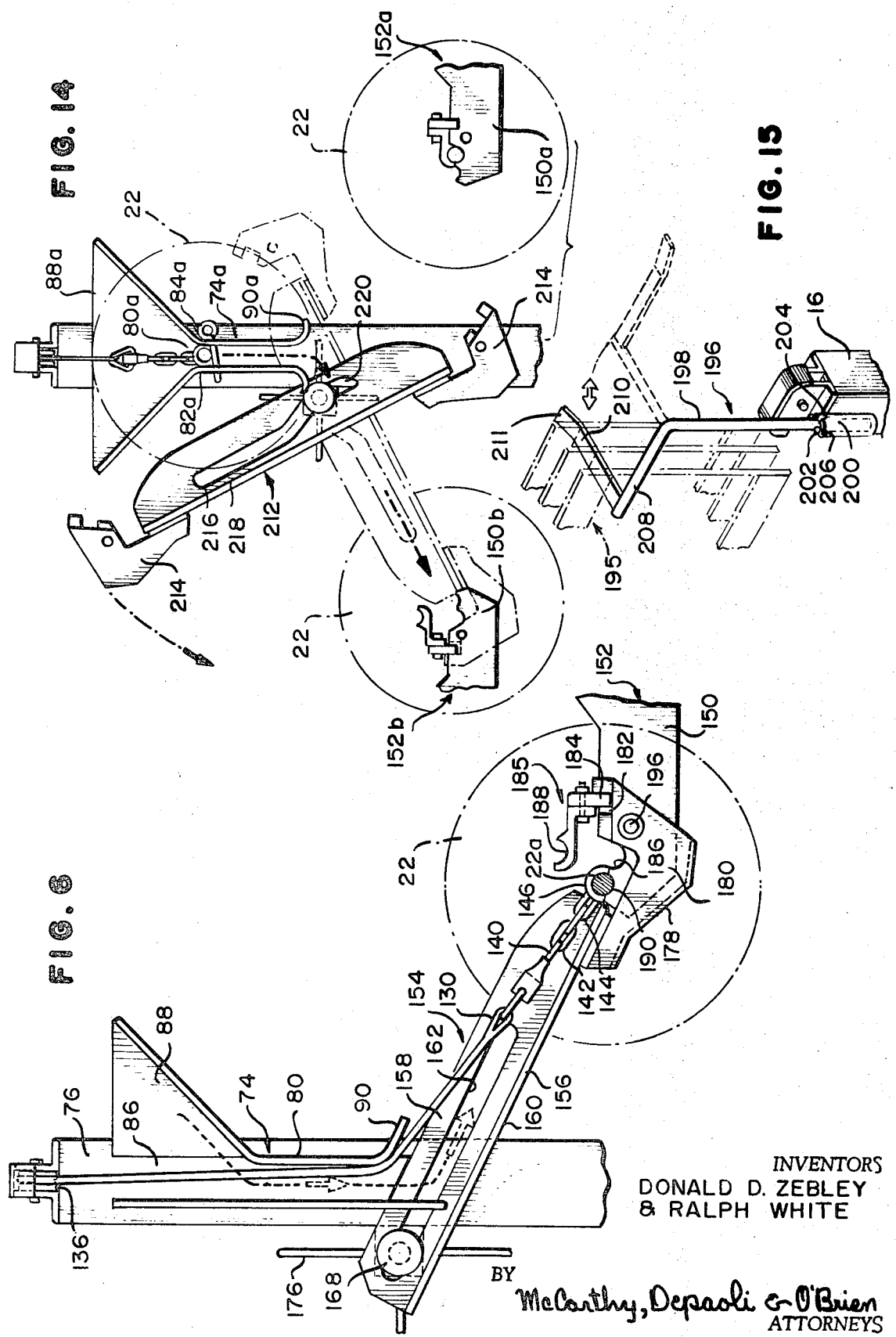

INVENTORS
DONALD D. ZEBLEY
& RALPH WHITE

BY
McCarthy, Depaoli & O'Brien
ATTORNEYS

Nov. 17, 1970  D. D. ZEBLEY ET AL  3,540,097
HOISTING AND TRANSPORTING APPARATUS, ESPECIALLY
FOR LOOM WARP BEAMS
Filed Oct. 21, 1968  5 Sheets-Sheet 5
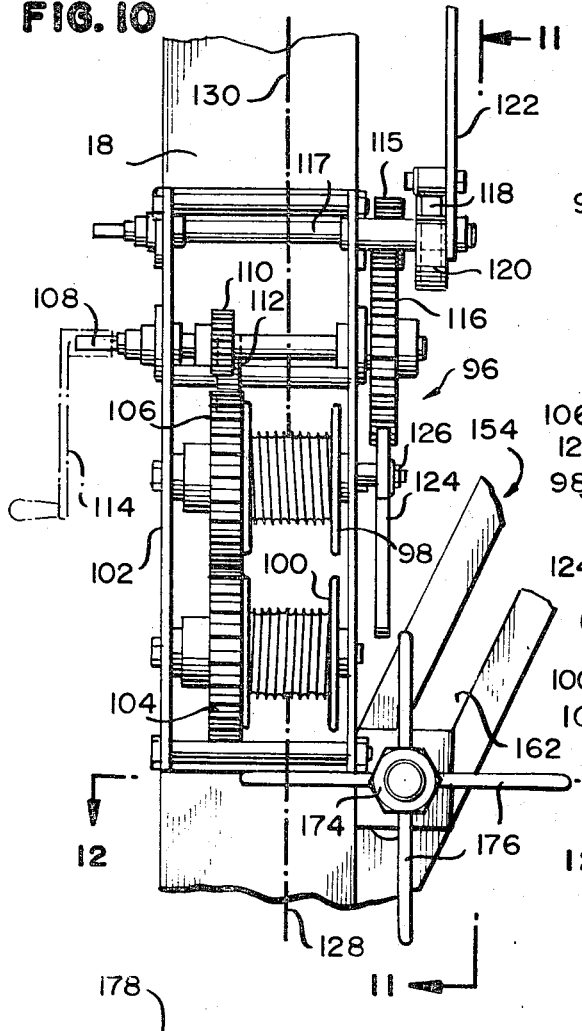
FIG. 10
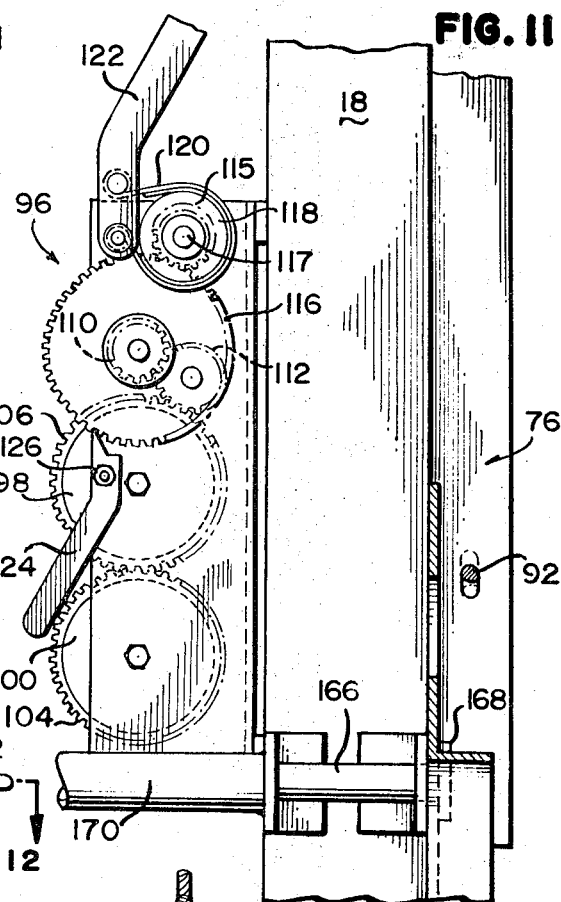
FIG. 11
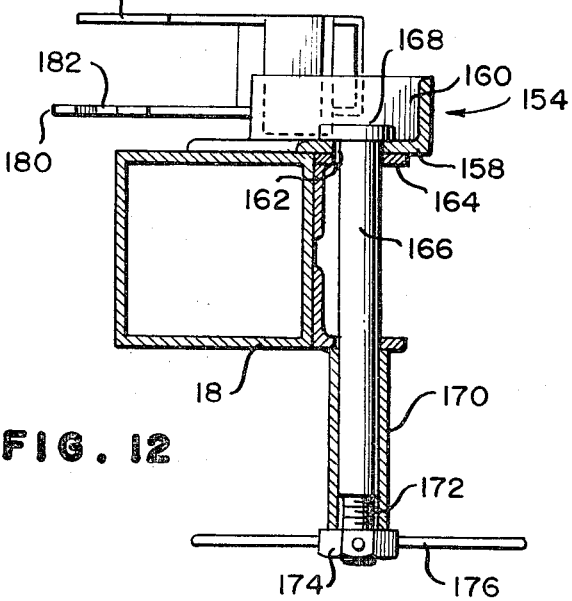
FIG. 12
FIG. 13
INVENTORS
DONALD D. ZEBLEY
& RALPH WHITE
BY McCarthy, Depaoli & O'Brien
ATTORNEYS

3,540,097
HOISTING AND TRANSPORTING APPARATUS, ESPECIALLY FOR LOOM WARP BEAMS
Donald D. Zebley, Greenville, S.C., and Ralph White, Aragon, Ga., assignors to United Merchants and Manufacturers, Inc., New York, N.Y., a corporation of Delaware
Filed Oct. 21, 1968, Ser. No. 769,299
Int. Cl. D03j 1/00
U.S. Cl. 28—41
22 Claims

ABSTRACT OF THE DISCLOSURE

A warp beam truck having an elongated wheel supported and steerable frame including longitudinally spaced cooperating vertical trackways between which a warp beam is suspended by winch cables removably affixed to the journal ends of the beam with the beam ends being releasably locked in the trackways by removable locking pins so that the beam is carried at the center of gravity of the truck and lateral transfer arms swingably and slideably carried by the frame and constituting lateral extensions of the lower ends of the trackways, the transfer arms normally being held by a locking means in retracted substantially vertical position and being laterally extensible from the frame and having means on their extended ends for locating and locking them in lateral projection from the frame to the warp beam supporting arms of a loom and winch means carried by the frame for operating the cables so as to lay the beam into the loom with the ends of the beam traveling in the trackways and transfer arms.

BACKGROUND OF THE INVENTION

Field of the invention

This invention generally appertains to improvements in load hoisting or lifting and transporting apparatus and, more particularly, relates to new and novel improvements in trucks for use in transporting a warp beam from a warp beam storage rack to a loom and laying the warp beam in the loom and also for transferring a pattern harness and frame and warp beam assembly from a makeup room or pattern truck to a loom.

Description of the prior art

The prior art is replete with various types of lifting and transporting trucks which have been particularly designed for use in laying a warp beam into a loom. Representative of exemplary prior patents are U.S. Pats. No. 2,477,871; 2,189,010 and 2,038,660. These patents disclose trucks used for transporting warp beams and laying them on looms and generally depict the state of the patent art.

The utilization of such patented structures and known types of conventional warp beam trucks, such as are found in use in weaving mills, require the servies of at least two and most often three workmen to propel and maneuver the trucks with the warp beam mounted thereon from the warp beam storage rack through the narrow loom alleys to the particular loom on which the warp beam is to be laid. In transferring the loom from such trucks, the task is extremely difficult and is fraught with danger to the workmen.

Present day looms require warp beams of larger size, both with respect to length and the amount of warp threads carried on the beam, yet such looms are situated in relatively close arrangement so that narrow loom alleys are to be found in all mills. Thus, in laying warp beams on the looms many problems are involved. Two problems, in particular, have not been obviated by the prior art truck structures. These two problems involve the movement or maneuvering of the truck with the warped beam through the narrow loom alleys and the task of transferring the warp beam from the truck to the loom.

While there are warped beam trucks, such as that disclosed in U.S. Pat. 2,477,871, which carry the beam by its journal ends, the most prevalent type trucks, used for transporting warp beams, are the type that support the beam along its body portion rather than by the journal ends of the beam. Such latter trucks essentially comprise a wheeled dolly having a jack-type body on which the warp beam is disposed. With such truck, at least two persons are needed to move the dolly with the warp beam thereon from a warp beam storage rack and tediously and carefully maneuver it down a narrow loom alley until the warp beam is disposed in front of the loom. The supporting plate of the jack is then swung so as to position one of the journal ends of the warp beam on one of the supporting arms of the loom and such inserted end is then used as a fulcrum end with two workmen grasping the opposite journal end by attaching a pipe extension thereto and swinging the warp beam around the first inserted end and inserting the opposite end into the opposite supporting arm of the loom and then pulling the pipe away from the end while, at the same time, the services of a third person are required, to pull the truck out of the way in order to enable the two workmen to maneuver in the narrow space available in the loom aisle.

None of the patented warp beam trucks or those known in the industry and conventionally used are capable of being operated by a single person so that a warp beam can be moved down narrow loom alleys by a single person and the warp beam can be transferred from a warp beam truck to a loom by a single person without any possibility of injury to the person and without any physical fatigue being incurred by the person and without any damage to the warp yarn on the warp beam. In addition, conventionally constructed and employed warp beam trucks, which have required the services of at least two persons to maneuver the truck through the narrow loom alleys, have no means for fixably locating the truck relative to the loom during the transfer of the warp beam from the truck to the loom. Therefore, the task of laying warps into looms, under present transportation conditions, is extremely difficult, fatiguing to at least the two or more workmen and is fraught with the possibility of injury to the workmen. In addition, the laying of warp beams always involves the problem of possible damage to the warp yarns. The latter is particularly true, when a warp beam with an associated pattern harness frame is to be placed on a loom. In such instance, it is necessary that the pattern truck upon which the warp beam and the harness frame are mounted be moved and maneuvered down the narrow loom alley and the harness frame be put on the loom and then the warp beam be inserted in position by manual force using a form of fulcrum leverage involving the use of fulcrum and lift rods or bars and the services and physical exertion of two or three workmen.

Thus, it can be appreciated that the problems involved in the art are that conventional trucks are not capable of handling the presently employed larger warp beams and easily transporting them down the narrow loom alleys; that conventional warp beam trucks require, during the maneuvering of the loaded truck down the loom alley and the transfer of the warp beam from the truck to the loom, the physical services of at least two and most times three workmen; and, that the transfer of the warp beams from the truck to the loom is a tedious and physically exacting maneuver which is fraught with injury to the workman and which can result in damage to the warp threads.

SUMMARY

The present invention is directed to a warp beam truck, though it is envisioned that the truck of the persent invention can be used for placing rollers, cylindrical bodies, or the like on other types of machinery, for example, laying a roll of paper stock or a roller on a printing press or for handling beams or rolls of goods in a dye house, for example, on a jig dyer. However, for the purpose of understanding the novel structural nature of the present invention and appreciating the advantages thereof in solving the problems existing in the laying of warp beams on looms, the present invention will be more particularly described in relation to a loom and the laying of a warp beam thereon.

The warp beam truck of the persent invention generally comprises a frame which includes vertically disposed and spaced apart frame members having inner confronting faces provided with trackways between which a warp beam is longitudinally disposed with its journal ends slideably arranged in the trackways. The vertical frame members are rigidly interconnected by a longitudinally disposed elongated base frame member. One end of the frame is supported by caster wheels while the other end is supported by turning wheels and turning forces are transmitted to such turning wheels by a handle ararngement disposed conveniently at the outer face of one of the vertical frame members so that a single operator can maneuver the truck either forwardly or backwardly down a loom alley. A winch arrangement is carried by the truck and includes a pair of cooperatingly moving winch cables having free ends terminating in locking caps which are releasably fixed on the journal ends of the warp beam and thereby attach the warp beam to a winch mechanism which can be controlled by a hand crank or by battery operated motor on the truck so as to raise and lower the warp beam in the vertical trackways. Locking pins are provided for underlying the journal ends and wedgingly locking the journal ends in the trackways so as to lockingly position the warp beam in the trackways with the warp beam being longitudinally disposed between the vertical trackways and being carried at the center of gravity of the truck during motion of the truck.

Lateral transfer arms cooperate with the lower ends of the trackways and are provided with longitudinal slots which slideably and rotatably fit on supporting pins carried by the vertical frame members and means is provided to lock the transfer arms in normal substantially vertical travel positions. The transfer arms, when unlocked for movement, can be moved axially and swung vertically so as to constitute lateral continuations of the vertical trackways. When the transfer arms are extended from the frame of the truck in front of a loom, the outer ends of the transfer arms have means for locating and locking the transfer arms to the warp beam supporting arms of the loom and immobilizing the truck.

Thus, upon raising the warp beam slightly in the trackways through the operation of the winch mechanism, the locking pins can easily be withdrawn and then the winch mecanism is operative under the control of a single operator to lower the warp beam down the vertical trackways and onto trackways of the transfer arms, which transfer arm trackways constitute lateral prolongations or continuations of the vertical trackways, so as to lay the warp beam into the conventional outer recesses or pockets on the upper faces of the outer extremities of the warp arms of the loom. All of this can be carried out by a single operator in a safe, convenient and expeditious manner since the warp beam truck is positively located and locked in relation to the loom and the warp beam is transferred onto the arms of the loom without any possibility of physical injury to the operator or damage to the warp threads on the warp beam.

Accordingly, an important object of the present invention is to provide a warp beam truck that is extremely and easily maneuverable and is capable of carrying warp beams of any size in a safe and secure manner with the warp beam being carried at the center of gravity of the truck along and through narrow loom alleys under the control of a single person and to provide means for positively locating and locking the truck in front of the loom so that the truck is incapable of movement relative to the loom during the transfer of the warp beam from the truck to the loom.

Another important object of the present invention is to provide a warp beam truck having transfer arms that are laterally moveable, in a swingable and sliding fashion, and are capable of being securely locked to the warp beam supporting or journal arms of a loom and which enable the truck to be positively located in an immobilized fashion relative to the front of the loom and permit a single workman through the operation of a manually or motorized controlled winch mechanism to lower a warp beam from the truck and lay it on a loom.

A further important object of the present invention is to provide a warp beam truck that is highly maneuverable and easily controlled so that it is capable of carrying large size warp beams under the operation and control of a single person through narrow loom alleys without any responsibility of injury to the operator and harm to the warp beam or the warp threads thereon.

Another important object of the present invention is to provide a warp beam truck that greatly simplifies the task of laying warps into looms, eliminates the possibility of both fatigue and injury to the single workman needed for carrying out the operation and also insures the laying of warp beams with little or no damage to the warp threads on the warp beam.

A still further important object of the present invention is to provide a simple, compact, sturdy and inexpensive warp beam truck which will enable a single unskilled workman to transport and install a warp beam.

BRIEF DESCRIPTION OF THE DRAWINGS

FIG. 1 is a side elevation view of the elevating and transporting apparatus or, more specifically, in connection with the herein disclosed preferred environmental useage of the present invention, of the warp beam truck, showing a conventional warp beam in phantom lines disposed in a mounted and carried position on the truck, which is utilized for transporting the warp beam to a loom and laying it on the loom.

FIG. 2 is a top plan view of the appartaus or warp beam truck.

FIG. 3 is a bottom plan view, showing the wheel supporting means for the frame and in relation therewith illustrating the steering mechanism whereby one person can propel or move and guide the truck through and along the narrow loom alleys in a mill.

FIG. 4 is an end elevational view of the warp beam truck, shown in FIGS. 1 and 3.

FIG. 5 is a vertical cross-sectional view, taken substantially on line 5—5 of FIG. 1, and shows, in elevation, the inner face of one of the vertical frame members or ends of the truck, which interior face constitutes a track way and also shows, in elevation, one of the transfer arms; it being understood that a transfer arm is structurally associated with each of the vertical frame members and its associated trackway.

FIG. 6 is a view similar to FIG. 5 but showing the transfer arm locked to the journal arm of a loom, with only a portion of the journal arm of the loom being shown for the purpose of comprehending the locking position and arrangement of the transfer arms in relation to the vertical trackways of the truck and to the journal supports or arms of the loom.

FIG. 10 is a detailed vertical sectional view, taken substantially on line 10—10 of FIG. 1, and showing in elevation the winch mechanism for controlling the winch cables, which are illustrated in FIG. 8 and shown in attached association with the warp beam in FIG. 1.

FIG. 11 is a vertical sectional view taken substantially on line 11—11 of FIG. 10, and also showing the brake and locking arrangement for the winch drums.

FIG. 12 is a detailed, fragmentary horizontal sectional view, taken substantially on line 12—12 of FIG. 10, and showing the means for locking the transfer arms in the normal retracted position, as shown generally in FIG. 4, such position being the one that the transfer arms assume during travel of the truck.

FIG. 13 is a detailed, perspective view of one of the winch cable ends, illustrating the locking caps provided on the free ends of the cables for releasably engaging the journal ends of the warp beam and thereby securely affixing the ends of the warp beam to the winch cables so that the warp beam is suspended and carried by the winch cables and is raised and lowered in the trackways by means of the winch mechanism, shown in FIGS. 10 and 11.

FIG. 14 is a view of a modified form of transfer arm, the view being similar to that of FIG. 5 but showing a double transfer arm arrangement whereby the arms can be moved laterally to either side of the longitudinal axis of the truck so that the carried warp beam can be transferred laterally from either side of the truck with the truck always being pushed down the loom alley.

FIG. 15 is a perspective view of auxiliary supporting rods which are carried by the upper ends of the vertical ends of the frame and are provided for supporting the harness frame when the harness frame and warp beam are carried by the truck to a loom.

DESCRIPTION OF THE PREFERRED EMBODIMENTS

Figure 7:
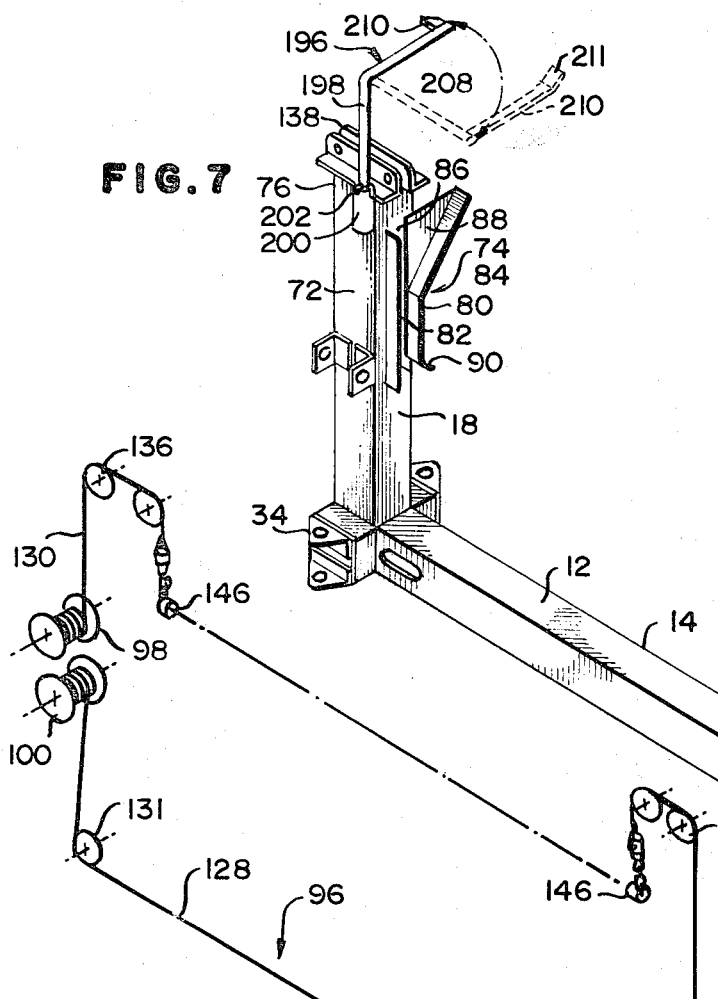
FIG. 7 is a perspective view of the frame of the truck and also shows in perspective the supporting rods which are associated with the vertical ends of the frame and are provided for supporting the harness frame when the truck is used for transporting a pattern harness frame and associated warp beam from a makeup room or pattern truck to a loom.

Referring now more particularly to the accompanying drawings, and initially to FIGS. 1 and 7, the hoisting and supporting apparatus or, as more specifically termed in connection with its application for laying a warp beam in a loom, warp beam truck 10 comprises a rigid, generally U-shaped frame 12, which is shown in detail in FIG. 7.

The frame 12 includes a longitudinally extending base beam 14 interconnecting, in a spaced and rigidly fixed fashion, a pair of spaced apart, vertically disposed, upright frame members 16 and 18. The base frame beam or member 14 is preferably of rectangular hollow stock and can be formed in a telescopic arrangement so that it will be composed of two slidably arranged sections whereby the longitudinal distance or space between the vertical frame members 16 and 18 can be adjusted so as to enable the truck to handle warp beams of differing length. In such instance, the base frame beam 14 will have two sections fixedly carried by the vertical frames and having inner telescopically arranged ends with bolt assemblies or similar fastening means being provided to secure such telescopical inner ends in adjusted relationship, whereby the longitudinal dimension of the truck can be varied.

The vertical frame members 16 and 18 are disposed in parallel, rigidly spaced apart relationship and are provided on their inner confronting faces with trackways 74, as shown more particularly in FIGS. 5 and 6, wherein the journal ends 22a of a conventional warp beam 22, as generally depicted in FIG. 1, are disposed, as will be described.

The lower end of the vertical frame member 16 is connected to the adjoining end of the longitudinal frame base member 14 along with an angle plate 24 which has a horizontal flange 26 that serves as a supporting plate for the underlying web portions 28 of swivelly mounted holders 30 for caster wheels 32. The portions 28 of the holders are swivelly attached to the supporting flange plate 26 by suitable bolt assemblies, whereby such end of the frame is supported by the swivelly mounted caster wheels 32. The lower end of the other vertical frame member 18 is provided with oppositely extending sets of lateral ears 34 within which the mounting blocks 36 of wheel spindles 38 are pivotally disposed with the plates and ears having vertically registering apertures that receive suitable vertical mounting pins 40. Ground engaging wheels 42 are rotatably mounted on the spindles 38 with the wheels being in slightly greater spacement laterally of the frame than the caster wheels, as shown in FIG. 3, but with the wheels being of no greater relative lateral spacement than the angle plate 24, as shown in FIG. 3, so that the truck is of relatively narrow dimension, including the wheel mounting frameworks carried at the opposite ends of the truck. In this regard, also, it is to be noted that the longitudinal base frame member 14 is of the same stock as the upright or vertical frame members 16 and 18, with all of such members being of similar rectangular cross-sectional sturdy but light weight tubular stock.

Figure 9:
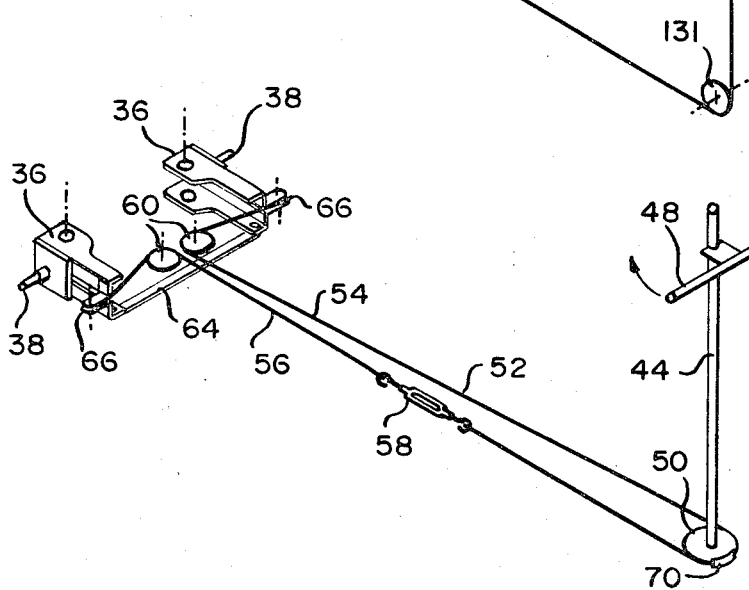
FIG. 9 is a perspective view of the steering mechanism, showing the cable arrangement, whereby the truck can be manipulated and steered from one end while either being pushed or pulled down a loom alley.

Means is provided for steering the steerable wheels 42 with the caster wheels 32 merely being mounted for free-swivel action in cooperative ground engagement with the wheels 42. Such steering means, as shown particularly in FIGS. 1, 3 and 9, comprises a vertical steering rod 44 which is rotatably supported by the apertured ears 46 projecting rearwardly from the vertical frame member 16. The steering rod 44 is provided, intermediate such mounting ears, with a transverse handle bar 48 and the lower end of the steering rod is provided with a circular steering drum 50. A steering cable 52 is adapted to be disposed about and attached to the steering drum, as will be described. The steering cable has side by side reaches 54 and 56, with the reach 56 being provided with a turn buckle 58 for tensioning the cable. The steering cable reaches 54 and 56 are passed around guide sheaves 60 that are disposed internally of the longitudinal frame member 14 and are mounted on vertical supporting pins 62 adjacent the lower end of the vertical frame member 18. The spindle blocks 36 are operatively interconnected by a pivoted connecting link 64 and the cables, after passing around the sheaves, terminate in loop ends 66 which are fastened to pins 68 carried by the rearward ends of the spindle blocks 36.

The cable reaches are disposed within the interior of the longitudinal frame member 14 as are the sheaves so that the entire steering arrangement is protected from dirt, lint, threads and the like with the steering drum protected by the end and the associated end frame. In assembling the steering, after the cable is assembled and tensioned by means of the turn buckle arrangement 58 and the steering handle bar or arm 48 is properly positioned normal to the longitudinal axis of the truck, the cable is secured to the drum by a suitable clamping means 70.

The provision of the turn buckle not only permits the cable to be properly tensioned but is also necessary in any telescopic arrangement of the longitudinal or base frame member 14 since it permits the cable to be properly extended or distended in accordance with the length of the truck. By virtue of the turnbuckle, the steering cable is adjustable.

As shown in FIGS. 1 and 5, the inner confronting faces 72 of each of the vertical frame members 16 and 18 are formed, adjacent their upper end portions 76, with vertical trackways 74, this being the primary purpose of the vertical frame members 16 and 18, which may be generally termed vertical trackways since they function to guidingly support the journal ends 22a of the warp beam 22, generally shown in FIG. 1, and to hold the warp beam in conjunction with a locking means 78, as will be described, for transporting the warp beam in a manner so that the warp beam is carried at the center of gravity of the truck during motion of the truck.

The trackways 74 are composed of vertical channels 80 having side flanges or walls 82 and 84. The side wall 84 has its upper end flared upwardly and laterally outwardly to define with the web portion 86 a wide downwardly tapered entrance throat 88 for the trackway 74, while the side wall 82 is straight and disposed perpendicularly. The lower end of the side wall 84 is curved outwardly so as to define an outwardly curved guide lip 90.

The journal ends 22a of the warp beam are held by winch means, as will be described, within the trackways and the opposing confronting faces of the vertical frames 16 and 18 by the locking means 78 which includes locking pins 92. The locking pins 92 are formed with enlarged heads 94 and have their shanks fitted through slightly vertical offset openings in the side walls 82 and 84 of the guide trackways with the pins 92 disposed at a declined angle in a sloping direction so that the inner inserted ends of the pins lie in a lower plane than the outer headed ends 94 whereby the journal ends 22a of the warp beam 22 are held by the lowermost ends of the pins within the confines of the side walls of the trackways, so that the load of the warp beam is borne by the pins and the trackway rather than by the pins alone. However, in this respect, the size of the pins is such and the pins are of such material that they are capable of supporting the weight of the warp beam without shearing. But, the inclined lodgement of the pins permits the weight to be transferred somewhat to the trackways and vertical frame members rather than being borne entirely by the pins. Such wedging locking arrangement ensures that the locking pins will hold the warp beam in a locked position between the frame members 16 and 18, as shown in FIG. 1.

Figure 8:
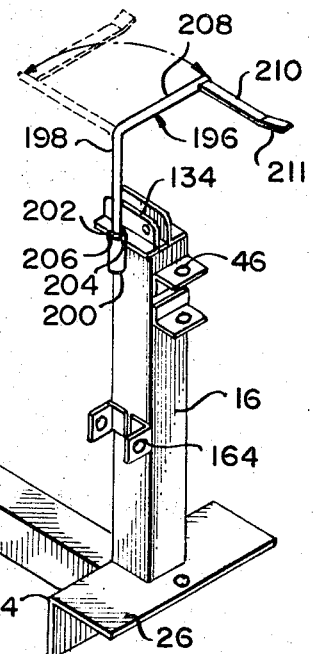
FIG. 8 is a perspective showing of the winch assembly and depicts the means whereby the winch cables are attached to the journal ends of the warp beam.

Winch means 96, generally shown in FIGS. 1 and 5, and shown in diagrammatic detail in FIG. 8, is provided for raising and lowering the warp beam within the trackways and relative to the locking pins 92.

As shown in FIGS. 10 and 11, the winch drums 98 and 100 are rotatably journalled in the vertical side walls of a housing 102 carried vertically by the outer face of the vertical frame member 18 with the drums having intermeshing gears 104 and 106. A drive shaft 108 is rotatably journalled between the side walls and carries a gear 110 connected by an intermediate gear 112 to the gear 106 for transmittal of a common drive to the winch drums. The shaft 108 may be manually powered by a hand crank 114 or it may be driven by an electric motor mounted on the support plate 26 along with an energizing battery through a suitable drive transmission of a simple nature, such as a belt and pulley drive transmission arrangement. The shaft 108 also carries on its outer end a large gear 116 which is intermeshed with a gear 115 carried by a shaft 117 on which a brake drum 118 is fixedly located. A brake band 120 is operatively associated with the brake drum 118 and is controlled by a brake lever 122, which is pivoted on the side wall of the housing 102. The gear 116 is also engaged by a locking dog 124 which is pivoted on a pin 126 carried by one of the side walls of the housing 102.

Thus, it can be seen that the drums 98 and 100 are simultaneously and synchronously actuated, either through the hand crank or through a motor drive arrangement, with the braking means being provided for controlling the winching operation and the locking dog 124 being provided for locking the free ends of the winch cables 128 and 130 in selected positions when they are in attachment to the journal ends 22a of the warp beam 22. The winch cable 128 is disposed within the interior of the longitudinal base frame member 14 and extends upwardly in the vertical frame 16 and is guided over guide sheaves 131 vertically disposed within the frame member 14 adjacent the ends thereof and is guided over sheaves 132 rotatably mounted between upstanding ears 134 on the upper end of the vertical frame member 16. The cable 130 from the winch drum 98 is guided over similar guide sheaves 136 rotatably carried by upstanding supporting ears 138 on the upper end of the vertical frame member 18.

Each of the cables, as shown in FIG. 1, terminates in a swivel linkage 140 with the outer link 142 connected by means of a connecting link 144 to a coupling or attaching cap 146, which is adapted to be sleeved onto the journal ends 22a of the warp beam 22. The journal ends 22a are adapted to fit within the interior of the caps 146 and the caps are provided with a spring urged detent 148 that protrudes radially inwardly from the side walls thereof so as to frictionally lock the caps on the journal ends of the warp beam and thereby securely affix the winch cables to the journal ends of the warp beam.

As shown and described, it can be appreciated that the warp beam truck 10 can be easily manipulated by a single person into a position so that a warp beam by means of an overhead hoist arrangement can be lowered from a warp beam rack into the wide entrance throats 88 of the trackways 74. Prior to the lowering of the warp beam into the trackways, the end caps 146 on the winch cables are sleeved onto the journal ends 22a of the warp beam 22 so that the winch cables are securely attached to the warp beam. The warp beam is lowered by the conventional overhead hoist arrangement from a position on the storage rack so that the journal ends are placed within the trackways with the capped journal ends, as shown in FIG. 5, resting on the locking pins 92 and bearing against the side wall 82 of the trackways. The journal ends, after the winch cables are attached thereto, are easily introduced into the widely flared upper ends of the trackways and guided thereby into the vertical lower channel portion 80 of the trackway 74 where they come to rest on the locking pins 92. The hoist chains of the overhead hoist are then removed from the warp beam and the warp beam is solely supported and carried by the truck.

As can be appreciated from a consideration of FIGS. 1 and 5, the warp beam is so positioned on the truck that it is carried at the center of gravity of the truck during truck motion and the warp beam is substantially within the later confines and dimensions of the truck, as constituted by the wheel base thereof.

The warp beam truck, with the warp beam 22 securely supported thereon, can then easily be pushed or pulled and maneuvered through the loom room and moved down a loom alley by a single workman grasping the handle bar 48 until it is positioned in front of a loom onto which the warp beam is to be laid.

In connection with the transferring of the warp beam from the truck to the conventional warp beam journal or supporting arms 150 of a loom 152 (as fragmentarily shown in FIGS. 4–6), transfer arms 154 are provided in functional and structural cooperative relationship with the vertical trackways. The transfer arms 154 comprise angle irons 156 which have right angularly related flange portions or side walls 158 and 160. The walls 160 are disposed normal to outlet ends of the trackways so that they can constitute extensions thereof with the walls 160 extending parallel with the longitudinal axis of the truck in the same manner as the walls 82 and 84 of the channels 80 defining the trackways. The walls 158 are provided with elongated longitudinal slots 162 so as to mount the walls 158 on the apertured supporting ears 164 that laterally project from the side faces of the vertical frame members 16 and 18.

Thus, as shown more particularly in FIG. 12, the apertured ears 164 support a locking pin 166 having its head 168 engaging the inner face of the slotted walls 158 of the transfer arms 154 with the pin extending through the apertured ears and through a tubular projection 170 on the outermost ear and having a threaded end 172 on which a locking nut 174 is threaded. The locking nut 174 is provided with radiating hand rods 176 so that the locking nut can be easily loosened or tightened whereby the head 168 will lock the transfer arms in vertical carrying positions or permit the transfer arms to be moved longitudinally and rotated about the pins 166, The transfer arms 154 are normally held in substantially vertically disposed retracted positions, as shown in FIG. 5, so that the transfer arms are entirely within the confines of the wheel base of the truck when the truck is being moved in transporting a warp beam to a loom.

Each of the transfer arms 154 is formed with an outer angular or hook-like end portion 178 that is bifurcated and has an angular outer end 180 terminating in a notched out face 182 which is adapted to receive a lug 184 that is a part of the conventional structural make-up of the warp beam journal arms 150 on which the warp beam is journalled in attachment to the loom. As shown in FIGS. 5 and 6, the warp beam supporting or journal arms 150 of the loom 152 are also conventionally provided with bearing mounts 185 for the journal ends of the warp beam, such being in the nature of a U-shaped cavity or recess 186 formed in the upper face of each arm and having a complemental hinged U-shaped portion 188 that can be swung down to overlie the journal ends 22a of the warp beam and cooperate with the recess 186 in providing a locking bearing or mounting arrangement for the journal ends of the warp beam. Immediately in advance of the recess 186, the upper face of each of the supporting arms 150 is formed with a shallow recess 190 into which the journal ends of the warp beam are initially laid. The journal ends of the warp beam are initially laid into the recesses 190 in the warp beam supporting arms of a loom so that the tieing-in worker can maneuver the warp beam in tying the warp beam threads onto the warp yarn already on the loom. After the warp beam threads are properly tied, the worker then moves the warp beam into the bearing cavity 186 and then the ring gear on the warp beam becomes engaged with the loom gearing and the bearing cap 188 is swung down and locked in position.

In transferring the warp beam from the truck to the loom, the locking means for the transfer arm 154 is released by rotating the locking nut 174 and loosening the head 168 so as to enable the single workman to slide the arms downwardly and swing them upwardly, as can be realized from a consideration of FIGS. 5 and 6. When the arms are swung upwardly, the notches 182 reecive the lugs 184 with such components constituting a means for locating the transfer arms 154 in relation to the warp beam journal or support arms 150 of the loom. As soon as the transfer arms are locked in relation to the support arms 150 of the loom, they are locked to the support arms and, for this purpose, the outer end portions 178 of the transfer arms 154 are provided with transverse apertures 192 which are axially registerable with transverse apertures 194 provided in the outer end portions of the warp beam journal or support arms 150 of the loom. Locking pins 196 are adapted to fit through the registering apertures in the transfer and support arms and thus pin the arms together.

As can be appreciated from a consideration of FIGS. 5 and 6, when the transfer arms 154 are loosened, the one workman involved swings each arm up into engagement with the support arms 150 of the loom and locks the outer end portions 178 of the transfer arms 154 to the loom, whereupon the truck is immobilized with respect to the loom and the transfer arms are positioned so that the side walls 160 of the transfer arms underlie the lower exit ends of the vertical trackways 74 and constitute lateral continuations or extensions of the trackways.

The workman then raises the warp beam 22 by actuating the winch mechanism, either through the crank or through an automatic arrangement, as generally outlined in the foregoing, so as to lift the journal ends 22a of the warp beam 22 from the locking pins, whereupon the locking pins 92 can be withdrawn. Then, by controlling the brake arrangement, the cables 128 and 130 of the winch drums 98 and 100 can be played out to safely and easily lower the warp beam 22 in the vertical trackways 74 and then onto the side walls 156 of the transfer arms 154 which function as lateral extensions or prolongations of the vertical trackways with the warp beam moving easily, safely and dependably toward the loom until the journal ends finally come to rest in the outer recesses or sockets 190 on the warp beam supporting arms 150 of the loom 152. The winch cables are guided by the guide lips 90. At this time, the caps 146 can be pulled off from the journal ends 22a, since the journal ends are of a length that the cap bearing extremities thereof will project beyond the outer side faces of the supporting arms 150. The transfer arms 154 can then be swung back to their normal, substantially vertical positions and locked in such retracted positions by tightening the locking nut 174 through the hand spoke arrangement 176. The warp beam truck, in such empty condition, can then be returned to a proper storage place.

It is well known, in the weaving art, that when a loom pattern is to be changed and there is not sufficient room in the loom alleys for a loom worker to change the pattern on the loom, a pattern is made up in a pattern make-up room, and then the harness and frame along with the warp beam are transferred by a pattern truck to a loom with the harness and frame being transferred from the pattern truck to the loom and the warp beam being transferred onto its support arms on the loom. This transporting and transferring operation requires a considerable amount of manual exertion and dexterity to be expended by at least three workmen.

The truck of the present invention is adaptable for transferring a harness and frame and the associated warp beam from a pattern make-up room or from a pattern truck to a loom. In this respect, the warp beam is supported and carried by the truck and transfered from the truck to a loom in the manner as outlined in the foregoing. The arness and frame 195 are supported by supporting means 196, as shown in FIGS. 7 and 15. The supporting means 196 is formed from a L-shaped rod having a vertical mounting portion 198 which is socketed in a vertical tubular socket 200 carried by the side faces of each of the vertical frame members 16 and 18 at the upper end portions thereof. The vertical mounting portions 198 are adapted to fit within the tubular sockets 200 and the vertical mounting portions 198 are provided with a pair of diametrically opposing radially extending pins 202 that are adapted to selectively fit in diametrically opposed pairs of radial locking notches 204 and 206 formed on the upper edge portion of the tubular sockets 200. The rods have horizontally disposed portions 208 which carry laterally projecting horizontal arms 210 on which the harness and frame are adapted to rest with the harness and frame extending longitudinally between the vertical frame members 16 and 18 in a position overlying the carried warp beam. The arms 210 are of flat stock and terminate in upturned outer ends or lips 211 that prevent the harness and frame from falling off from the arms. When the harness and frame are carried by the truck, the horizontal arms 210 extend laterally from the truck and the pins 202 are fitted in the locking notches 204, as shown in full lines in FIG. 7 and in dotted lines in FIG. 15.

However, when the truck is being returned from the loom, after the harness and frame and the warp beam are mounted and laid on the boom, then the vertical mounting portions 198 of the rods are unlocked and moved upwardly and rotated and then resocketed so that the locking pins engage in the notches 206, whereby the arms are supported so that the lateral horizontal arms 210 thereof face in a direction aligned with the horizontal axis of the truck as shown in full lines in FIG. 7.

It can be appreciated that if the warp beam carried by the truck is to be laid on a loom which is disposed either to the right or left of an alley as the truck is being moved down the alley, then it is necessary for the single required workman to either push the truck down the alley or to pull it down the alley, since the transfer arms can move or project only from one side of the truck. If the warp beam is to be laid on a loom that is to the right of the workman, then the workman can push the truck down the alley but if the warp beam is to be laid on a loom that is to the left of the workman, then the workman has to pull the truck down the alley.

In actual practice, this poses no difficulty and has been found very easy to accomplish since the truck can be easily pushed or pulled and the steering arrangement is of such a simple and convenient nature that a single workman can most easily and conveniently propel or push and, in either event, steer and maneuver the truck so as to bring the truck in front of the loom on which the warp beam is to be laid.

However, in order to avoid the necessity of pulling the truck down the narrow alley and to enable the truck always to be pushed, it is proposed to provide transfer arms, such as shown in FIG. 14, which can project laterally from either side of the truck. With the transfer arms 212 of FIG. 14, the workman can push the truck down the alley without regard to whether the warp beam is to be laid off from the left or right of the truck, since the transfer arms 212 can swing either to the left or the right of the truck and can constitute left lateral extensions or right lateral extensions of the slightly modified vertical trackways 74a shown in FIG. 14.

The trackways 74a are similar to the trackways 74 of FIGS. 4–6 except that the upper ends of both of the side walls 82a and 84a of the channel 80a are outwardly and upwardly flared so that the entrance throat 88a extends laterally from both side walls 82a and 84a while the lower ends of the side walls 82a and 84a are provided with upwardly and outwardly curved guides lips 90a. The lips 90a serve the same purpose as the lip 90 of the embodiment of FIG. 5 in guiding the winch cables to either side of the track.

The transfer arms 212 have opposing operative end portions 214 which are formed in the same manner and fashion as the end portion 178 on the transfer arm 154 and which are provided with the same locating and locking means in respect to the warp beam support arms 150 as shown in FIG. 14. The locking arrangement for the double end transfer arms 212 is the same as shown in connection with the transfer arms 154 (FIG. 12) but the arms 212 have a longitudinal switching and sliding slot 216. The slot 216 has an elongated end portion 218 lying below another elongated end portion 220 and joined thereto by an angular central juncture so that the connected slot portions are offset lengthwise of the arms. By virtue of the slot configuration, the arms 212 can be moved axially in either direction laterally of the longitudinal axis of the truck 10 and can be swung into located and locked relationship with the warp beam support arms 150a or 150b of looms 152a or 152b on either side of a loom alley. Thus the truck can be pushed down an alley and service a loom on either side thereof.

It can be realized that the truck of the present invention solves the problems attendant with the laying of warp beam in looms and that the simple, sturdy and easily maneuvered nature thereof permits a single workman to propel and move it down a narrow loom alley while the winch and locking arrangements and the transfer arms enable the sole workman to effect a quick and safe transfer of the wrap beam from the truck to a loom on either side of the loom alley.

While the truck has been specifically described and shown in connection with transporting and laying in warp beams on a loom, it can with slight modification of the relative arrangement of the transfer arms and winch mechanism be utilized to the same advantages for laying in top beams on a loom. In this respect, a top beam is merely another warp beam except that it is disposed adjacent the top of the loom instead of near the bottom as in the positioning of a warp beam. Thus, in laying in a top beam, such beam would be hoisted up the trackways instead of lowered down them and the transfer arms would cooperate with the upper ends of the trackways while being locked to the loom so that the top beam would be hoisted into place rather than lowered into place as is the case of the warp beam 22.

Although the truck 10 has been particularly described in an environmental usage involving transporting and laying in warp beams on a loom, it can be appreciated that the same will find utility, due to its structural make-up, ease of maneuvering and arrangement of the trackways and lateral transfer arms, in other fields, as broadly outlined in the summary herein. Thus, different environmental usages and purposes of the present invention as well the changes in the various arrangements thereof are well within the scope and spirit of the present invention as defined in the appended claims.

What is claimed is:

1. A hoisting and transporting apparatus of the type described comprising an elongated frame including spaced apart, opposing and confrontingly cooperating vertical trackways between which a component having opposite ends is adapted to be disposed for transportation and placement on a machine, winch means operatively carried by the frame and including winch cables having end portions slidably related with the trackways and provided with means for detachable attachment to the ends of the component, said trackways being adapted to guidingly receive said ends of the component, means for releasably securing the component in a secured carried position between the trackways, means structurally associated with the frame for imparting maneuvering mobility thereto, lateral transfer means carried by the frame and mounted thereon in relation to the trackways for sliding and swinging movement laterally of the longitudinal axis of the frame and structurally associated with each of the trackways to constitute lateral prolongations thereof, means for releasably locking said transfer means in inoperative substantially vertical positions, means mounting said lateral transfer means for outward lateral sliding and swinging movement relative to the trackways upon release of said locking means therefor and means carried by the transfer means for locking said transfer means in a laterally projected relation to the trackways and in fixedly located relation with a machine on which the component is to be placed so that such transfer means constitutes lateral prolongations of the trackways in cooperating with the winch cables for transferring the component from the trackways onto the machine.

2. The invention of claim 1 wherein said frame is composed of a longitudinal beam member having opposing ends and vertical frame members attached to said ends and extending in the same direction perpendicularly to the longitudinal beam member and having parallel inner faces upon which the trackways are disposed.

3. The invention of claim 2 wherein said vertical frame members have outer end portions and said trackways include channels fixedly located on the inner faces of said frame members adjacent the outer end portions.

4. The invention of claim 3 wherein said longitudinal beam member constitutes a base member for the frame and said vertical frame members rigidly upstand from the ends thereof with the trackways being provided on the upper end portions of the inner faces of said vertical frame members.

5. The invention of claim 4 wherein said longitudinal base member and the vertical frame members are of relatively narrow substantially equal width and said means for imparting maneuvering mobility to the frame includes a transverse mounting end frame fixedly carried by one end of the base member, ground engaging swivel caster wheels supported by said end frame, a pair of ground engaging steerable wheels and means mounting said steerable wheels to the other end of the base member, said steerable wheels being disposed on opposite sides of the base member and being spaced laterally apart at relatively short distance which is substantially equal to the lateral spacement between the caster wheels and means carried by the frame for steering the steerable wheels as the frame is pulled or pushed by a single workman.

6. The invention of claim 5 wherein said steering means includes a vertical steering rod having upper and lower ends, means carried by the outer face of the vertical frame member remote from the steerable wheels within which the steering rod is rotatably supported, a lateral handle bar on the upper end of the steering rod, a steering drum carried by the lower end of the steering rod, steering cables connected to the drum and extending longitudinally therefrom along the length of the base member, said other end of the base member having laterally extending supports, wheel spindle blocks pivotally mounted on said supports for movement about vertical axes, said blocks having spindles upon which the steerable wheels are rotatably journalled, a crosswise connecting link pivotally interconnecting the spindle blocks and means attaching said cables to the spindle blocks.

7. The invention of claim 6 wherein said base member is tubular and said steering cables are guidingly disposed lengthwise therewithin.

8. The invention of claim 1 wherein said means for releasably securing the component in a secured carried position between the trackways includes removeable locking pins inserted transversely through the trackways and adapted to underlie the ends of the component.

9. The invention of claim 8 and locking means structurally associated with the winch means and said winch means having actuating means for controlling the winching operation of the cables in attachment to the ends of the component.

10. The invention of claim 1 wherein said frame includes a longitudinal base member having opposing end portions and vertical frame members disposed perpendicularly to and upstanding from the longitudinal base member and secured to the end portions thereof, said trackways including channels fixedly located on the inner faces of the vertical frame members, said channels having upper open ends and lower open ends and said transfer means including transfer arms mounted on the vertical frame members for swinging and sliding lateral movement from substantially vertical inoperative positions to substantially horizontal operative positions below the lower ends of the channels and extending laterally therefrom and from the vertical frame members to constitute lateral prolongations of the channels.

11. The invention of claim 10 wherein said upper ends of the channels are laterally flared so as to define large throat portions within which the ends of the component can be vertically introduced for passage into the channels and said locking means includes removeable locking pins passed through openings in the side walls of the channels so as to be transversely positioned in the channels and underlie the ends of the component.

12. The invention of claim 11 wherein at least one of the side walls of the channels has a lower outwardly curved end defining a guide for the winch cable in such channel.

13. The invention of claim 11 wherein each of said transfer arms is an angle iron having an axially slotted side wall, a supporting pin positioned in the slot in said side wall and on which the transfer arm is slidably and swingably mounted, means carried by each of the vertical frame members for supporting the pins, and means associated with the pins for locking the arms in inoperative substantially vertical positions, each of said arms having another side wall adapted to be disposed substantially normal to the lower open end of each of the channels and on which the ends of the component rides as it is lowered by the winch cables from the channels.

14. The invention of claim 13 wherein said locking means carried by the transfer means includes outer end portions on the transfer arms having means for positively locating the transfer arms relative to a component supporting means on the machine and interengaging means between said outer end portions of the arms and the supporting means of the machine for locking the end portions to the component supporting means of the machine.

15. A warp beam truck for transporting a warp beam to a loom and transferring the warp beam onto the warp beam supporting arms of the loom, comprising an elongated, relatively narrow frame composed of a longitudinal base member having opposing end portions and vertical frame members rigidly upstanding from the end portions and having inner confronting spaced apart faces, channel shaped trackways vertically provided on the inner faces adjacent the upper end portions of the vertical frame members and within which the journal ends of a warp beam are adapted to be slidably located, winch means carried by one of the vertical frame members and including winch cables having end portions slidably related with the trackways, said vertical frame members having upper ends provided with guide means around which the winch cables are guidingly disposed with the end portions extending downwardly into the channels, means carried by the end portions of the winch cables for attachment to the journal ends of the warp beam, locking means removeably positioned transversely through the trackways to lockingly underlie the journal ends of the warp beam and secure the warp beam between the vertical frame members with the warp beam carried at the center of gravity of the truck during motion of the truck, said base member having a fixed transverse end frame on one end, ground engaging swivel caster wheels depending from and supported by said end frame, steerable ground engaging wheels carried by the other end of the frame, means carried by the frame for steering said steerable wheels as the frame is pushed or pulled by a single workman, said trackways having open upper ends in which the journal ends of the warp beam are introduced for passage into the trackways and having lower open ends from which the journal ends are lowered out of the trackways by the winch cables after the locking means is released, lateral transfer arms swingably and slidably carried by the vertical frame members, means carried by the vertical frame members for supporting the transfer arms for swinging and lateral sliding movement so as to project laterally from at least one side of the frame adjacent the lower ends of the trackways, said supporting means including means for locking the arms in inoperative substantially vertical positions as the truck is being moved with the carried warp beam to a position in front of a loom onto which the warp beam is to be laid, said transfer arms upon release of the locking means being laterally swingable and slidable so as to project laterally from the frame toward the warp beam supporting arms of the loom, means carried by the transfer arms for locating them in engagement with the warp beam supporting arms of the loom and interengaging locking means between the transfer arms and the supporting arms for locking the transfer arms to the supporting arms with the locker transfer arms immobilizing the truck in front of the loom and constituting lateral prolongations of the trackways so that the journal ends of the warp beam can be lowered down the trackways onto the transfer arms and into the supporting arms by the winch means.

16. The invention of claim 15 wherein the attachment means carried by the end portions of the winch cables includes caps adapted to be sleeved onto the extremities of the warp beam journal ends and said caps having internal means for frictionally engaging the journal ends.

17. The invention of claim 15 wherein said base member is tubular and said steering means includes steering cables extending longitudinally therein and connected to the steerable wheels, a vertical steering rod rotatably carried by the outer face of the vertical frame member remote from the steerable wheels and having upper and lower ends, a lateral steering and manual propulsion bar provided on the upper end of the rod and a steering drum provided on the lower end thereof and to which the steering cables are attached and adjusting means carried by the steering cables within the base member.

18. The invention of claim 15 wherein said vertical frame members are tubular and said winch means includes a pair of cooperating winch drums rotatably carried in adjoining parallel relation by the outer face of one of the vertical frame members and disposed transversely thereof, said drums having intermeshing vertical gears, an actuating gearing operatively connected to said gears and including actuating means and braking means, and locking means operatively associated with said gearing, one of the cables extending from one of the drums and passing through the base member and up through the other vertical frame member, guide means for said one cable, and the other cable extending upwardly through the one vertical frame member.

19. The invention of claim 15 wherein each of said transfer arms is an angle iron having one side wall provided with an axial slot, said supporting means for the transfer arms including pins carried by the vertical frame members and disposed in the slots and said locking means including locking nut assemblies on each pin for tightening the pins in the slots, said arms being mounted on the pins so as to swing under and laterally past the lower ends of the trackways when free to move and each of said transfer arms having another side wall disposed substantially normal to the lower ends of the trackways when the arms are laterally extended from the vertical frame members with said other side wall constituting a lateral prolongation of the trackways.

20. The invention of claim 19 wherein said locating means carried by the transfer arms includes outer end portions on the arms having means for interengagement with a projection on the warp beam supporting arms of the loom and said interengaging locking means includes said end portions having transverse apertures registerable with formed transverse apertures in the supporting arms and securing pins inserted through said registering apertures.

21. The invention of claim 15 wherein said transfer arms are mounted for lateral sliding and swinging movement laterally of both sides of the frame and have opposing end portions provided with said locating and interengaging locking means so that the arms can be secured to the warp beam supporting arms of either of two opposing looms in a loom alley.

22. The invention of claim 15 and including removeable upstanding arms carried by the upper ends of the vertical frame members and having horizontally disposed laterally positionable upper end portions upon which a pattern harness and frame can be mounted.

References Cited
UNITED STATES PATENTS

| | | | |
|---|---|---|---|
| 2,579,730 | 12/1951 | Eurey | 28—41 |
| 2,624,476 | 1/1953 | Schmidt | 28—41 |
| 2,706,056 | 4/1955 | Talley et al. | 214—390 |

FOREIGN PATENTS

| | | |
|---|---|---|
| 549,808 | 6/1930 | Germany. |

HENRY S. JAUDON, Primary Examiner

U.S. Cl. X.R.

214—10

UNITED STATES PATENT OFFICE
CERTIFICATE OF CORRECTION

Patent No. 3,540,097                   Dated November 17, 1970

Inventor(s)   Donald D. Zebley et al.

It is certified that error appears in the above-identified patent and that said Letters Patent are hereby corrected as shown below:

Column 1, Line 58, "servies" should be -- services --.
Column 2, Line 71, "workman" should be -- workmen --.
Column 3, Line 25, "ararngement" should be -- arrangement --
Column 3, Line 34, "battery operated" should be -- a battery operated --.
Column 3, Line 11, "existing" should be -- existent --.
Column 4, Line 24, "responsibility" should be -- possibility
Column 6, Line 37, "by the apertured ears" should be -- by apertured ears --.
Column 7, Line 25, "vertical" should be -- vertically --.
Column 8, Line 50, "later" should be -- lateral --.
Column 8, Lines 67-68, "exending" should be -- extending --.
Column 9, Line 49, "arm" should be -- arms --.
Column 9, Line 54, "reecive" should be -- receive --.
Column 9, Line 58, "locked" should be -- located --.
Column 10, Line 45, "transfered" should be -- transferred --
Column 10, Line 47, "arness" should be -- harness --.
Column 10, Line 75, "boom" should be -- loom --.
Column 11, Line 5, "horizontal" should be -- longitudinal --
Column 11, Line 46, "guides" should be -- guide --.
Column 12, Line 2, "wrap" should be -- warp --.
Column 12, Line 27, "as well the changes" should be -- as well as changes --.
Column 14, Line 72, "locker" should be -- locked --.

SIGNED AND SEALED
MAR 9 1971

(SEAL)
Attest:

Edward M. Fletcher, Jr.
Attesting Officer

WILLIAM E. SCHUYLER, J
Commissioner of Patent